(12) United States Patent
Lyman

(10) Patent No.: US 9,955,004 B2
(45) Date of Patent: *Apr. 24, 2018

(54) SYSTEM AND METHOD FOR UTILIZING CUSTOMER DATA IN A COMMUNICATION SYSTEM

(71) Applicant: Fonality, Inc., Plano, TX (US)

(72) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,903

(22) Filed: Jun. 1, 2016

(65) Prior Publication Data

US 2016/0277567 A1   Sep. 22, 2016

Related U.S. Application Data

(63) Continuation of application No. 12/405,204, filed on Mar. 16, 2009, now Pat. No. 9,443,244.

(51) Int. Cl.
*H04M 15/00* (2006.01)
*H04M 3/42* (2006.01)
(Continued)

(52) U.S. Cl.
CPC ........ *H04M 3/42068* (2013.01); *G06Q 30/01* (2013.01); *G06Q 30/02* (2013.01); *H04M 3/5232* (2013.01)

(58) Field of Classification Search
USPC .... 379/112.01, 219, 114.29, 121.04, 142.06, 379/142.15
See application file for complete search history.

(56) References Cited

U.S. PATENT DOCUMENTS 4,653,090 A   3/1987 Hayden
5,533,110 A   7/1996 Pinard et al.
(Continued)

FOREIGN PATENT DOCUMENTS

WO   WO2004049121 A2   6/2004
WO   WO2005036330 A2   4/2005
WO   WO2006020168 A2   2/2006

OTHER PUBLICATIONS

Parmar, Rashik "Enhanced Enterprise Communication: Transforming the bank into a proactive relationship center." IBM Global Services. May 2004.

(Continued)

*Primary Examiner* — Yosef K. Laekemariam
(74) *Attorney, Agent, or Firm* — Dentons US LLP

(57) ABSTRACT

Systems and methods for utilizing customer data in a communication system are provided. In exemplary embodiments, customer records at a customer data warehousing system are accessed. Customer data from the customer records are extracted and associated with a customer identifier. The customer data is then stored to an indexed database, the extracted customer data being indexed according to the identifier. When an incoming communication is received, the communication system will determine a communication identifier of the incoming communication. A lookup and matching process is then performed using the communication identifier in the indexed customer information database. If a matching customer identifier is found, associated customer data may be retrieved and used to provide enhanced communication system services including communication routing and customer data alerts.

19 Claims, 7 Drawing Sheets

(51) Int. Cl.
    *G06Q 30/02*      (2012.01)
    *G06Q 30/00*      (2012.01)
    *H04M 3/523*      (2006.01)

(56) References Cited

U.S. PATENT DOCUMENTS

| | | | |
|---|---|---|---|
| 5,537,470 A * | 7/1996 | Lee | H04M 3/51 |
| | | | 379/142.06 |
| 5,703,943 A | 12/1997 | Otto | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,067,525 A | 5/2000 | Johnson et al. | |
| 6,104,711 A | 8/2000 | Voit | |
| 6,137,869 A | 10/2000 | Voit et al. | |
| 6,282,574 B1 | 8/2001 | Voit | |
| 6,359,880 B1 | 3/2002 | Curry et al. | |
| 6,389,132 B1 | 5/2002 | Price | |
| 6,400,719 B1 | 6/2002 | Chimura et al. | |
| 6,418,214 B1 | 7/2002 | Smythe et al. | |
| 6,430,275 B1 | 8/2002 | Voit et al. | |
| 6,430,289 B1 | 8/2002 | Liffick | |
| 6,453,038 B1 * | 9/2002 | McFarlane | H04M 3/5233 |
| | | | 379/265.05 |
| 6,628,765 B1 | 9/2003 | Bangs et al. | |
| 6,718,030 B1 | 4/2004 | Turner et al. | |
| 6,782,412 B2 | 8/2004 | Brophy et al. | |
| 6,820,083 B1 | 11/2004 | Nagy et al. | |
| 6,937,703 B1 | 8/2005 | Andreason | |
| 6,964,370 B1 | 11/2005 | Hagale et al. | |
| 7,007,074 B2 | 2/2006 | Radwin | |
| 7,031,442 B1 | 4/2006 | Neyman et al. | |
| 7,035,619 B1 | 4/2006 | Fargano et al. | |
| 7,035,923 B1 | 4/2006 | Yoakum et al. | |
| 7,039,165 B1 | 5/2006 | Saylor et al. | |
| 7,065,184 B2 | 6/2006 | Vishik et al. | |
| 7,076,036 B1 | 7/2006 | Johnson | |
| 7,089,237 B2 | 8/2006 | Turnbull et al. | |
| 7,092,509 B1 | 8/2006 | Mears et al. | |
| 7,120,238 B1 | 10/2006 | Bednarz et al. | |
| 7,136,875 B2 | 11/2006 | Anderson et al. | |
| 7,194,531 B2 | 3/2007 | Donker et al. | |
| 7,213,073 B1 | 5/2007 | Slavin | |
| 7,231,229 B1 | 6/2007 | Hawkins et al. | |
| 7,274,781 B2 | 9/2007 | Lipton et al. | |
| 7,333,976 B1 | 2/2008 | Auerbach et al. | |
| 7,441,002 B1 | 10/2008 | Catchpole et al. | |
| 7,477,730 B2 | 1/2009 | Starbuck et al. | |
| 7,496,185 B1 | 2/2009 | Primavesi et al. | |
| 7,496,189 B2 | 2/2009 | Clarisse et al. | |
| 7,536,000 B2 | 5/2009 | Ho | |
| 7,567,662 B1 | 7/2009 | Renner et al. | |
| 7,586,908 B2 | 9/2009 | Nelson et al. | |
| 7,606,221 B2 | 10/2009 | Artru et al. | |
| 7,664,096 B2 | 2/2010 | Doherty et al. | |
| 7,664,495 B1 | 2/2010 | Bonner et al. | |
| 7,685,010 B2 | 3/2010 | Goldberg et al. | |
| 7,706,522 B2 | 4/2010 | Shaffer et al. | |
| 7,711,104 B1 | 5/2010 | Flockhart et al. | |
| 7,716,263 B2 | 5/2010 | Masek | |
| 7,835,510 B2 | 11/2010 | Akachi | |
| 7,844,677 B1 | 11/2010 | Asher et al. | |
| 7,881,454 B2 | 2/2011 | Tuchman et al. | |
| 7,920,549 B2 | 4/2011 | Alt et al. | |
| 7,983,404 B1 | 7/2011 | Croak et al. | |
| 8,098,810 B2 | 1/2012 | Lyman | |
| 8,131,872 B2 | 3/2012 | Kennedy et al. | |
| 8,132,001 B1 | 3/2012 | Patten et al. | |
| 8,214,265 B2 | 7/2012 | Peters | |
| 8,223,941 B2 | 7/2012 | White et al. | |
| 8,341,535 B2 | 12/2012 | Lyman | |
| 8,379,832 B1 | 2/2013 | Lyman | |
| 8,495,653 B2 | 7/2013 | Lyman | |
| 8,499,246 B2 | 7/2013 | Lyman | |
| 8,571,202 B2 | 10/2013 | Lyman | |
| 8,693,659 B2 | 4/2014 | Lyman | |
| 8,719,386 B2 | 5/2014 | Lyman et al. | |
| 8,780,925 B2 | 7/2014 | Otto et al. | |
| 8,787,548 B2 | 7/2014 | Lyman | |
| 8,832,717 B2 | 9/2014 | Lyman | |
| 8,976,952 B2 | 3/2015 | Lyman | |
| 9,001,993 B2 | 4/2015 | Lyman | |
| 9,395,873 B2 | 7/2016 | Lyman | |
| 9,443,244 B2 | 9/2016 | Lyman | |
| 2002/0009073 A1 | 1/2002 | Furukawa et al. | |
| 2002/0029258 A1 | 3/2002 | Mousseau et al. | |
| 2002/0035605 A1 | 3/2002 | McDowell et al. | |
| 2002/0064149 A1 | 5/2002 | Elliott et al. | |
| 2002/0110234 A1 * | 8/2002 | Walker | H04Q 3/64 |
| | | | 379/266.01 |
| 2002/0116336 A1 | 8/2002 | Diacakis et al. | |
| 2002/0120687 A1 | 8/2002 | Diacakis et al. | |
| 2003/0002521 A1 | 1/2003 | Traversat et al. | |
| 2003/0009530 A1 | 1/2003 | Philonenko et al. | |
| 2003/0026414 A1 | 2/2003 | Baker et al. | |
| 2003/0078986 A1 | 4/2003 | Ayres et al. | |
| 2003/0112941 A1 | 6/2003 | Brown et al. | |
| 2003/0219029 A1 | 11/2003 | Pickett | |
| 2003/0228010 A1 | 12/2003 | Clarisse et al. | |
| 2004/0001573 A1 | 1/2004 | Gusler et al. | |
| 2004/0039889 A1 | 2/2004 | Elder et al. | |
| 2004/0042444 A1 | 3/2004 | Edmon et al. | |
| 2004/0062383 A1 | 4/2004 | Sylvain | |
| 2004/0083306 A1 | 4/2004 | Gloe | |
| 2004/0088356 A1 | 5/2004 | Sellen et al. | |
| 2004/0093387 A1 | 5/2004 | Wick | |
| 2004/0107267 A1 | 6/2004 | Donker et al. | |
| 2004/0133888 A1 | 7/2004 | Ard et al. | |
| 2004/0141508 A1 * | 7/2004 | Schoeneberger | H04L 41/5064 |
| | | | 370/401 |
| 2004/0170267 A1 | 9/2004 | Seligmann | |
| 2004/0179515 A1 | 9/2004 | Kamani et al. | |
| 2004/0179672 A1 | 9/2004 | Pagel et al. | |
| 2004/0203944 A1 | 10/2004 | Huomo et al. | |
| 2004/0218747 A1 | 11/2004 | Ranalli et al. | |
| 2004/0246331 A1 | 12/2004 | Caspi et al. | |
| 2004/0260771 A1 | 12/2004 | Gusler et al. | |
| 2004/0264670 A1 | 12/2004 | Flores et al. | |
| 2004/0267887 A1 | 12/2004 | Berger et al. | |
| 2005/0068166 A1 | 3/2005 | Baker | |
| 2005/0068227 A1 | 3/2005 | Caspi et al. | |
| 2005/0074101 A1 | 4/2005 | Moore et al. | |
| 2005/0076095 A1 | 4/2005 | Mathew et al. | |
| 2005/0105709 A1 | 5/2005 | Dutronc et al. | |
| 2005/0111440 A1 | 5/2005 | Artru et al. | |
| 2005/0135593 A1 | 6/2005 | Becerra et al. | |
| 2005/0152347 A1 | 7/2005 | Chen et al. | |
| 2005/0201362 A1 | 9/2005 | Klein et al. | |
| 2005/0209861 A1 | 9/2005 | Hewes et al. | |
| 2005/0220283 A1 | 10/2005 | Ho | |
| 2005/0239501 A1 | 10/2005 | Idnani et al. | |
| 2005/0243978 A1 | 11/2005 | Son et al. | |
| 2005/0246588 A1 | 11/2005 | Deng et al. | |
| 2006/0019655 A1 | 1/2006 | Peacock | |
| 2006/0026232 A1 | 2/2006 | Malik | |
| 2006/0039545 A1 | 2/2006 | Rahman et al. | |
| 2006/0093099 A1 | 5/2006 | Cho | |
| 2006/0093121 A1 | 5/2006 | Sylvain | |
| 2006/0100923 A1 | 5/2006 | Courchesne | |
| 2006/0109811 A1 | 5/2006 | Schotten et al. | |
| 2006/0117264 A1 | 6/2006 | Beaton et al. | |
| 2006/0121916 A1 | 6/2006 | Aborn et al. | |
| 2006/0140452 A1 | 6/2006 | Raynor et al. | |
| 2006/0146870 A1 | 7/2006 | Harvey et al. | |
| 2006/0147009 A1 | 7/2006 | Greenlee et al. | |
| 2006/0166678 A1 | 7/2006 | Karaoguz et al. | |
| 2006/0167747 A1 | 7/2006 | Goodman et al. | |
| 2006/0177032 A1 | 8/2006 | Abramson et al. | |
| 2006/0185004 A1 | 8/2006 | Song et al. | |
| 2006/0195532 A1 | 8/2006 | Zlateff et al. | |
| 2006/0210046 A1 | 9/2006 | Smith | |
| 2006/0212519 A1 | 9/2006 | Kelley et al. | |
| 2006/0256789 A1 | 11/2006 | Otto et al. | |
| 2006/0256942 A1 | 11/2006 | Gatzke et al. | |

(56) References Cited

U.S. PATENT DOCUMENTS

| | | |
|---|---|---|
| 2006/0288099 A1 | 12/2006 | Jefferson et al. |
| 2007/0011337 A1 | 1/2007 | Brown et al. |
| 2007/0041527 A1 | 2/2007 | Tuchman et al. |
| 2007/0061197 A1 | 3/2007 | Ramer et al. |
| 2007/0064913 A1 | 3/2007 | Shaffer et al. |
| 2007/0078708 A1 | 4/2007 | Yu et al. |
| 2007/0121896 A1 | 5/2007 | Patakula et al. |
| 2007/0153747 A1 | 7/2007 | Pan et al. |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0031228 A1 | 2/2008 | Gallant |
| 2008/0095355 A1 | 4/2008 | Mahalaha et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2009/0275314 A1 | 11/2009 | Cotevino et al. |
| 2010/0174807 A1 | 7/2010 | Lyman et al. |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2011/0306298 A1 | 12/2011 | Lyman |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins et al. |
| 2013/0268866 A1 | 10/2013 | Lyman |
| 2013/0268948 A1 | 10/2013 | Lyman |
| 2014/0029745 A1 | 1/2014 | Lyman |

OTHER PUBLICATIONS

Montgomery, Warren & Copeland, Rebecca "Network Intelligence for Presence Enhanced Communication." Nov. 2001. http://tools.ietf.org/id/draft-montgomery-copeland-presence-spirits-00.txt.

Ott, Jorg "Presence Aggregation in Endpoints." Technologiezentrum Informatik, Jan. 15, 2003.

Broder, et al., Search Advertising Using Web Relevance Feedback, 2008, pp. 1013-1022, Conference on Information and Knowledge Management, Proceeding of the 17th AC conference on Information and Knowledge Management. Yahoo Research. Oct. 26, 2008.

Hull, et al., "Enabling Context-Aware and Privacy-Conscious User Data Sharing", Jul. 2004, Proceedings of the 2004, IEEE International Conference on Mobile Data Management. Aug. 2004. Accessed Aug. 2011. http://ieeexplore.ieee.org/xpl/freeabs_all.jsp?arnumber=1324414.

Inter-Tel, Inc. "Advanced Applications Design Guide for Contact Center Suite." Issue 1. Apr. 2006.

User Guide, "What is Xact View? Xact View User Guide", Schmooze Communications LLC 2008. Accessed Aug. 2011. www.schmoozecom.com; available at http://literature.schmoozecom.com/XactView/UserGuide/UserGuideXactView.pdf.

Kim, Fryer, ed., "System." Microsoft Press Computer Dictionary, 3rd Ed. Redmond: Microsoft, 1997 pp. 456-457.

Non-Final Office Action, dated Sep. 28, 2016, U.S. Appl. No. 12/228,301, filed Aug. 11, 2008.

Non-Final Office Action, dated Nov. 29, 2010, U.S. Appl No. 11/506,279, filed Aug. 17, 2006.

Non-Final Office Action, dated Jul. 19, 2011, U.S. Appl. No. 11/506,279, filed Aug. 17, 2006.

Final Office Action, dated Jan. 26, 2012, U.S. Appl. No. 11/506,279, filed Aug. 17, 2006.

Non-Final Office Action, dated Mar. 13, 2013, U.S. Appl. No. 11/506,279, filed Aug. 17, 2006.

Final Office Action, dated Aug. 13, 2013, U.S. Appl. No. 11/506,279, filed Aug. 17, 2006.

Notice of Allowance, dated Feb. 14, 2014, U.S. Appl. No. 11/506,279, filed Aug. 17, 2006.

Non-Final Office Action, dated May 12, 2011, U.S. Appl. No. 12/069,083, filed Feb. 6, 2008.

Notice of Allowance, dated Sep. 2, 2011, U.S. Appl. No. 12/069,083, filed Feb. 6, 2008.

Non-Final Office Action, dated Mar. 2, 2011, U.S. Appl. No. 11/800,302, filed May 3, 2007.

Final Office Action, dated Oct. 18, 2011, U.S. Appl. No. 11/800,302, filed May 3, 2007.

Non-Final Office Action, dated May 22, 2012, U.S. Appl. No. 11/800,302, filed May 3, 2007.

Notice of Allowance, dated Dec. 10, 2012, U.S. Appl. No. 11/800,302, filed May 3, 2007.

Non-Final Office Action, dated Nov. 9, 2011, U.S. Appl. No. 11/827,314, filed Jul. 11, 2007.

Final Office Action, dated Jul. 19, 2012, U.S. Appl. No. 11/827,314, filed Jul. 11, 2007.

Non-Final Office Action, dated Jan. 29, 2013, U.S. Appl. No. 11/827,314, filed Jul. 11, 2007.

Final Office Action, dated Jul. 23, 2013, U.S. Appl. No. 11/827,314, filed Jul. 11, 2007.

Advisory Action, dated Oct. 4, 2013, U.S. Appl. No. 11/827,314, filed Jul. 11, 2007.

Notice of Allowance, dated Nov. 27, 2013, U.S. Appl. No. 11/827,314, filed Jul. 11, 2007.

Non-Final Office Action, dated Dec. 22, 2010, U.S. Appl. No. 12/075,411, filed Mar. 10, 2008.

Final Office Action, dated Aug. 8, 2011, U.S. Appl. No. 12/075,411, filed Mar. 10, 2008.

Notice of Allowance, dated Jun. 13, 2012, U.S. Appl. No. 12/075,411, filed Mar. 10, 2008.

Non-Final Office Action, dated Jul. 6, 2011, U.S. Appl. No. 12/075,402, filed Mar. 10, 2008.

Non-Final Office Action, dated Apr. 19, 2012, U.S. Appl. No. 12/075,402, filed Mar. 10, 2008.

Notice of Allowance, dated Mar. 8, 2013, U.S. Appl. No. 12/075,402, filed Mar. 10, 2008.

Non-Final Office Action, dated Dec. 8, 2010, U.S. Appl. No. 12/075,401, filed Mar. 10, 2008.

Non-Final Office Action, dated Jun. 9, 2011, U.S. Appl. No. 12/075,401, filed Mar. 10, 2008.

Final Office Action, dated Oct. 31, 2011, U.S. Appl. No. 12/075,401, filed Mar. 10, 2008.

Advisory Action, dated Feb. 15, 2012, U.S. Appl. No. 12/075,401, filed Mar. 10, 2008.

Non-Final Office Action, dated Jun. 20, 2012, U.S. Appl. No. 12/075,401, filed Mar. 10, 2008.

Notice of Allowance, dated Mar. 4, 2013, U.S. Appl. No. 12/075,401, filed Mar. 10, 2008.

(56) References Cited

OTHER PUBLICATIONS

Non-Final Office Action, dated Nov. 7, 2011, U.S. Appl. No. 12/228,301, filed Aug. 11, 2008.
Final Office Action, dated Aug. 30, 2012, U.S. Appl. No. 12/228,301, filed Aug. 11, 2008.
Non-Final Office Action, dated Apr. 9, 2013, U.S. Appl. No. 12/228,301, filed Aug. 11, 2008.
Final Office Action, dated Aug. 8, 2013, U.S. Appl. No. 12/228,301, filed Aug. 11, 2008.
Advisory Action, dated Jul. 14, 2015, U.S. Appl. No. 12/228,301, filed Aug. 11, 2008.
Final Office Action Replaces Oct. 8, 2013 FOA, dated Nov. 22, 2013, U.S. Appl. No. 12/228,301, filed Aug. 11, 2008.
Advisory Action, dated Jan. 29, 2014, U.S. Appl. No. 12/228,301, filed Aug. 11, 2008.
Non-Final Office Action, dated Sep. 16, 2014, U.S. Appl. 12/228,301, filed Aug. 11, 2008.
Final Office Action, dated Apr. 8, 2015, U.S. Appl. No. 12/228,301, filed Aug. 11, 2008.
Non-Final Office Action, dated Feb. 17, 2016, U.S. Appl. No. 12/228,301, filed Aug. 11, 2008.
Non-Final Office Action, dated Aug. 19, 2010, U.S. Appl. No. 12/319,693, filed Jan. 8, 2009.
Final Office Action, dated May 3, 2011, U.S. Appl. No. 12/319,693, filed Jan. 8, 2009.
Non-Final Office Action, dated Oct. 21, 2011, U.S. Appl. No. 12/319,693, filed Jan. 8, 2009.
Final Office Action, dated May 17, 2012, U.S. Appl. No. 12/319,693, filed Jan. 8, 2009.
Non-Final Office Action, dated May 21, 2013, U.S. Appl. No. 12/319,693, filed Jan. 8, 2009.
Final Office Action, dated Oct. 7, 2013, U.S. Appl. No. 12/319,693, filed Jan. 8, 2009.
NOA, dated Jan. 7, 2014, U.S. Appl. No. 12/319,693, filed Jan. 8, 2009.
Non-Final Office Action, dated May 12, 2011, U.S. Appl. No. 12/405,197, filed Mar. 16, 2009.
Final Office Action, dated Jan. 4, 2012, U.S. Appl. No. 12/405,197, filed Mar. 16, 2009.
Non-Final Office Action, dated Sep. 5, 2013, U.S. Appl. No. 12/405,197, filed Mar. 16, 2009.
Non-Final Office Action, dated Feb. 12, 2014, U.S. Appl. No. 12/405,197, dated Mar. 16, 2009.
Non-Final Office Action, dated Oct. 27, 2014, U.S. Appl. No. 12/405,197, filed Mar. 16, 2009.
Non-Final Office Action, dated Mar. 19, 2015, U.S. Appl. No. 12/405,197, filed Mar. 16, 2009.
Non-Final Office Action, dated May 26, 2015, U.S. Appl. No. 12/405,197, filed Mar. 16, 2009.
Final Office Action, dated Apr. 14, 2016, U.S. Appl. No. 12/405,197, filed Mar. 16, 2009.
Non-Final Office Action, dated Feb. 1, 2012, U.S. Appl. No. 12/405,204, filed Mar. 16, 2009.
Non-Final Office Action, dated Dec. 6, 2012, U.S. Appl. No. 12/405,204, filed Mar. 16, 2009.
Final Office Action, dated Oct. 31, 2013, U.S. Appl. No. 12/405,204, filed Mar. 16, 2009.
Non-Final Office Action, dated Feb. 25, 2014, U.S. Appl. No. 12/405,204, filed Mar. 16, 2009.
Final Office Action, dated Aug. 14, 2014, U.S. Appl. No. 12/405,204, filed Mar. 16, 2009.
Advisory Action, dated Nov. 7, 2014, U.S. Appl. No. 12/405,204, filed Mar. 16, 2009.
Non-Final Office Action, dated Apr. 23, 2015, U.S. Appl. No. 12/405,204, filed Mar. 16, 2009.
Final Office Action, dated Oct. 21, 2015, U.S. Appl. No. 12/405,204, filed Mar. 16, 2009.
Advisory Action, dated Jan. 11, 2016, U.S. Appl. No. 12/405,204, filed Mar. 16, 2009.
Non-Final Office Action, dated May 24, 2013, U.S. Appl. No. 13/213,020, filed Aug. 18, 2011.
Non-Final Office Action, dated Dec. 9, 2013, U.S. Appl. No. 13/213,020, filed Aug. 18, 2011.
Non-Final Office Action, dated Mar. 19, 2014, U.S. Appl. No. 13/213,020, filed Aug. 18, 2011.
Final Office Action, dated Jul. 1, 2014, U.S. Appl. No. 13/213,020, filed Aug. 18, 2011.
Final Office Action, dated Aug. 22, 2014, U.S. Appl. No. 13/213,020, filed Aug. 18, 2011.
Advisory Action, dated Oct. 14, 2014, U.S. Appl. No. 13/213,020, filed Aug. 18, 2011.
Notice of Allowance, dated Nov. 4, 2014, U.S. Appl. No. 13/213,020, filed Aug. 18, 2011.
Non-Final Office Action, dated Dec. 18, 2013, U.S. Appl. No. 13/601,965, filed Aug. 31, 2012.
NOA, dated Apr. 10, 2014, U.S. Appl. No. 13/601,965, filed Aug. 31, 2012.
Non-Final Office Action, dated May 7, 2013, U.S. Appl. No. 13/738,841, filed Jan. 10, 2013.
Notice of Allowance, dated Aug. 15, 2013, U.S. Appl. No. 13/738,841, filed Jan. 10, 2013.
Non-Final Office Action, dated Jan. 14, 2014, U.S. Appl. No. 13/908,974, filed Jun. 3, 2013.
Notice of Allowance, dated Jun. 19, 2014, U.S. Appl. No. 13/908,974, filed Jun. 3, 2013.
Non-Final Office Action, dated Jun. 4, 2015, U.S. Appl. No. 13/909,064, filed Jun. 3, 2013.
Non-Final Office Action, dated Jan. 4, 2016, U.S. Appl. No. 13/909,064, filed Jun. 3, 2013.
Non-Final Office Action, dated Nov. 25, 2013, U.S. Appl. No. 14/036,977, filed Sep. 25, 2013.
Final Office Action, dated Jun. 6, 2014, U.S. Appl. No. 14/036,977, filed Sep. 25, 2013.
Advisory Action, dated Aug. 8, 2014, U.S. Appl. No. 14/036,977, filed Sep. 25, 2013.
Non-Final Office Action, dated Sep. 12, 2014, U.S. Appl. No. 14/036,977, filed Sep. 25, 2013.
Notice of Allowance, dated Jan. 5, 2015, U.S. Appl. No. 14/036,977, filed Sep. 25, 2013.
Notice of Allowance, dated May 10, 2016, U.S. Appl. No. 13/909,064, filed Jun. 3, 2013.
Notice of Allowance, dated May 18, 2016, U.S. Appl. No. 12/405,204, filed Mar. 16, 2009.
Non-Final Office Action, dated Mar. 15, 2017, U.S. Appl. No. 12/405,197, filed Mar. 16, 2009.

\* cited by examiner

SYSTEM AND METHOD FOR UTILIZING CUSTOMER DATA IN A COMMUNICATION SYSTEM

REFERENCE TO RELATED APPLICATION

This Nonprovisional Patent Application is a continuation of, and claims priority benefit of, U.S. patent application Ser. No. 12/405,204, filed Mar. 16, 2009, entitled "System and Method for Utilizing Customer Data in a Communication System," which is hereby incorporated by reference herein in its entirety including all references cited therein.

BACKGROUND OF THE INVENTION

1. Field of the Invention

Embodiments of the present invention relate generally to communication systems and more particularly to utilizing customer data in a communication system.

2. Description of Related Art

Conventionally, a customer data warehousing system, such as a relationship management (CRM) system, is used to allow a company to measure, control, and maintain records of contacts with their customers. The contact may be by such means as phone calls, mail, and e-mails. The data that is maintained by the customer data warehousing system may then be used to measure effectiveness of employees, analyze customer relationships, or perform other analysis and reporting functions. As such, the customer data warehousing system may comprise a collection of data about interactions with the company's customers. Thus, an agent associated with the company is able to look up a customer's record on the customer data warehousing system, and use the customer information in their dealings with the customer.

Conventionally, a phone system is configured to operate separate from a customer data warehousing system. That is a traditional phone system, which may include a PBX server, is only configured to receive and place phone calls. Therefore, there is no shared information between the customer data warehousing system and the phone system.

SUMMARY OF THE INVENTION

Embodiments of the present invention provide systems and methods for utilization of customer data from a customer data warehousing system in a communication system. In exemplary embodiments, customer records at the customer data warehousing system are accessed. Customer data from the customer records are extracted and associated with a customer identifier. The customer data is then stored to an indexed customer information database, the extracted customer data being indexed according to the customer identifier.

When an incoming communication is received, the communication system will determine a communication identifier of the incoming communication. Based on the communication identifier, a lookup and matching process with customer identifiers of the indexed customer information database is performed. If a match is found, customer data may then be retrieved and used to provide enhanced communication system services. In exemplary embodiments, the enhanced communication system services may include communication routing and customer data alerts.

DETAILED DESCRIPTION OF EXEMPLARY EMBODIMENTS

Embodiments of the present invention provide systems and methods for utilization of customer data in a communication system. In exemplary embodiments, customer records from a customer data warehousing system are accessed. Specific customer data may then be extracted and formatted for use on the communication system. The extracted customer data may then be stored to an indexed database in the communication system for local access. The indexed database may index the extracted customer data based on an identifier associated with the extracted customer data. When an incoming communication is received, a caller identifier associated with the incoming communication may be used to retrieve corresponding customer data from the formatted database.

Figure 1:
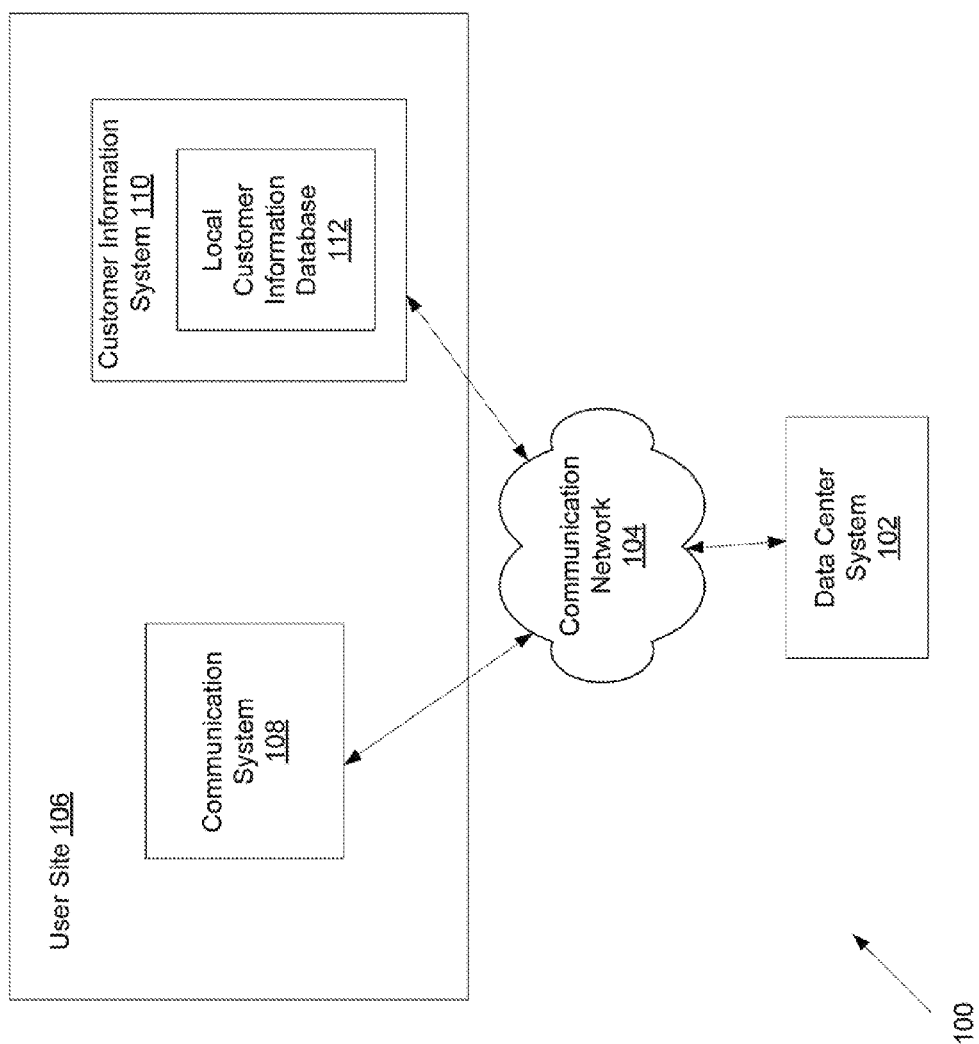
FIG. 1 is a diagram of an exemplary environment in which embodiments of the present invention may be practiced.

FIG. 1 shows an exemplary environment 100 in which embodiments of the present invention may be practiced. The exemplary environment 100 comprises a data center system 102 coupled via a communication network 104 to one or more user sites 106. The communication network 104 may comprise one or more local area networks or wide area networks, such as, for example, the Internet.

In exemplary embodiments, the data center system 102 is configured to access a customer information database and extract customer data. The extracted customer data may then be formatted for storage and use by a communication system 108. While only one data center system 102 is shown in the exemplary environment 100, alternative embodiments may comprise more than one data center system 102. For example, the data center systems 102 may be regionally established. The data center system 102 will be discussed in more detail in connection with FIG. 2.

The exemplary user site 106 is associated with a company, business, and/or organization using embodiments of the present invention. In some embodiments, the organization may provide sales, services, and/or support to their customers. In exemplary embodiments, the user site 106 may comprise the communication system 108 and a customer information system or customer data warehousing system 110. Additionally, the user site 106 may comprise modules and data which allow the user site 106 to communicate with the data center system 102. The modules and data may be preinstalled at the user site 106. Alternatively, the modules and data may be downloaded to the user site 106 at a later time (e.g., upon first access to the data center system 102). While only one user site 106 is shown, any number of different organizations may have user sites 106 coupled to the data center system 102.

In some embodiments, the communication system 108 is, or is associated with, a phone system or PBX system. The communication system 108 may comprise one or more storage media or devices comprising various engines and modules directed to embodiments of the present invention. The communication system 108 will be discussed in more detail in connection with FIG. 4. While examples of the communication system 108 will be discussed below in reference to a phone system, it is noted that any type of communication system may be used in alternative embodiments of the present invention. For example, the communication system 108 may comprise a chat system or an e-mail system.

The exemplary customer information system 110 is configured to store and maintain customer records in a local customer information database 112. These customer records may be used by agents, managers, or any other person associated with the organization or user site 106 to review past and current dealings and relationships with a customer. In exemplary embodiments, the customer information system 110 may include one or more storage media or devices comprising the local customer database 112 as well as modules and engines used to create and maintain the customer records. The customer information system 110 may also comprise other components not directed to embodiments of the present invention. In various embodiments, the customer information system 110 may be a customer relationship management (CRM) system, finance system, enterprise resource management (ERM) system, ticketing system, or any other customer data warehousing system.

The local customer information database 112 is configured to store the customer records for the user site 106. The customer records comprise information related to interactions between agents or individuals associated with the user site 106 and their customers. Such information may include date, duration, and subject matter of each interaction along with identity of the individuals (e.g., agents, customers) involved.

The environment 100 of FIG. 1 is exemplary. Alternative embodiments may comprise any number of data center systems 102 and user sites 106 coupled together via any type of one or more communication networks 104, and still be within the scope of exemplary embodiments of the present invention. Furthermore, each user site 106 may comprise any number of communication systems 108 and customer information systems 110.

Figure 2:
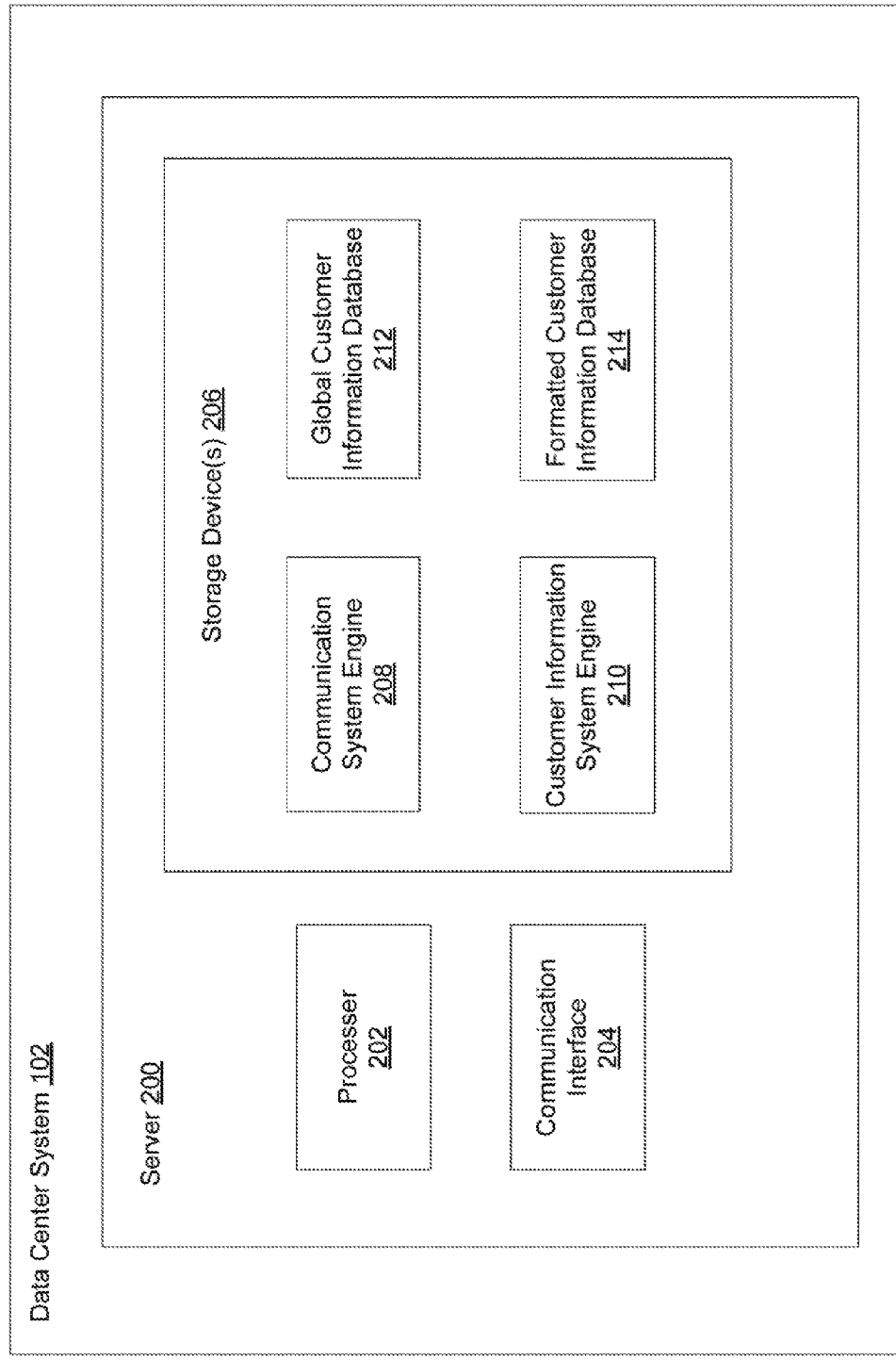
FIG. 2 is a block diagram of an exemplary data center system.

Referring now to FIG. 2, the exemplary data center system 102 is shown in more detail. In exemplary embodiments, the data center system 102 may comprise one or more servers 200 or other forms of computing devices, each of which may comprise a processor 202, a communication interface 204, and one or more storage device(s) 206. The communication interface 204 is configured to enable the server 200 to communicate via the communication network 104. In various embodiments, the communication interface 204 may comprise ports, other hardware, and/or software that allow for communications to and from the server 200.

The storage device(s) 206 may comprise storage for a plurality of applications, components, databases, and modules. In the present embodiment, the storage device(s) 206 comprises a communication system engine 208, a customer information system engine 210, a global customer information database 212, and a formatted customer information database 214. In various embodiments, the storage device(s) 206 may comprise memory devices, tape, disks, or integrated circuits.

The communication system engine 208 is configured to interact with the communication system 108. In exemplary embodiments, the communication system engine 208 exchanges information with the coupled communication system 108.

The customer information system engine 210 is configured to interact with the customer information system 110. In exemplary embodiments, the customer information system engine 210 trades data with the customer information system 110. Specifically, the customer information system engine 210 accesses customer records from the customer information system 110 and extracts customer data for use on the communication system 108. The customer information system engine 210 will be discussed in more detail in connection with FIG. 3.

The storage device(s) 206 is shown comprising the global customer information database 212 and formatted customer information database 214. The global customer information database 212 may be configured to store copies of customer records retrieved from one or more local customer information databases 112 at the data center system 102. The formatted customer information database 214 may be configured to store extract customer data after processing by the customer information system engine 210 as will be discussed further below. While the global customer information database 212 and the formatted customer information database 214 are provided, the original records and extracted customer data may not be stored in a database. Instead, the original records and/or the extracted customer data may be temporarily cached.

It should be noted that the data center system 102 of FIG. 2 is exemplary. Alternative embodiments may comprise varying numbers of components and other components, and still be within the scope of exemplary embodiments. For example, any number of servers 200 may comprise the data center system 102. In a further example, one or more of the modules of the customer information system engine 210, as will be discussed further below, may be located at the communication system engine 208 and vice-versa.

Figure 3:
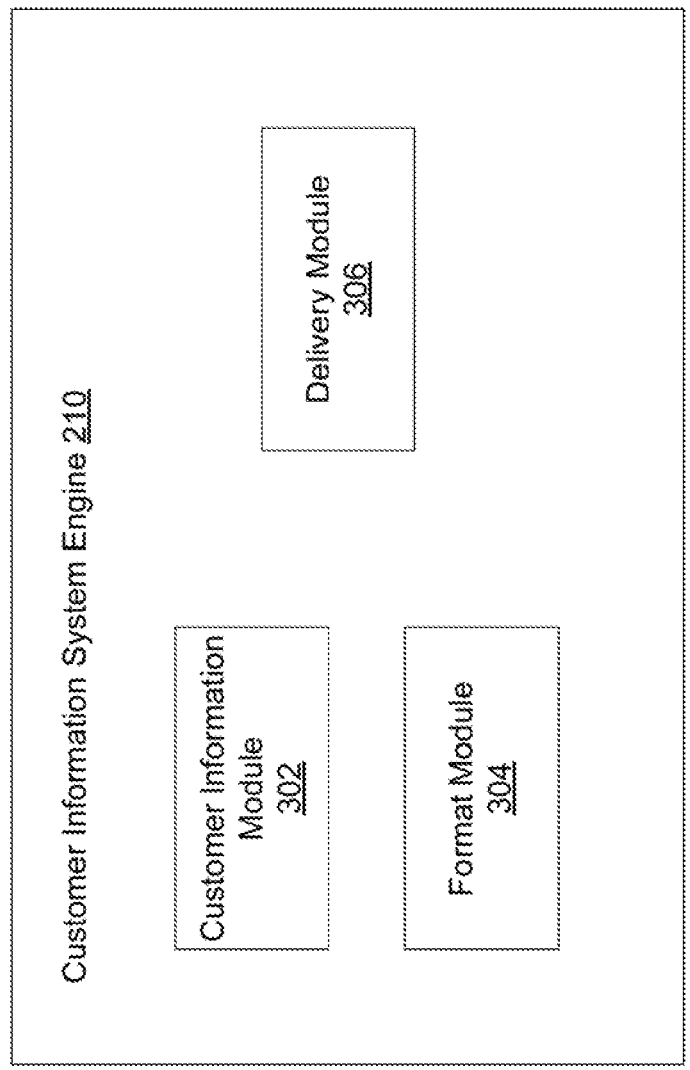
FIG. 3 is a block diagram of an exemplary communication system engine of the data center system.

Referring now to FIG. 3, the customer information system engine 210 is shown in more detail. The exemplary customer information system engine 210 is configured to access customer records from the customer information system 110, and to extract specific customer data from the customer records. The extracted customer data may then be formatted for use by the communication system 108. The customer information system engine 210 may comprise a customer information module 302, format module 304, and delivery module 306.

The customer information module 302 is configured to access customer records stored in the local customer information database 112 of the customer information system 110. The customer records may be accessed periodically (e.g., every two minutes) or constantly in real-time. The customer information module 302 may copy the customer records to the format module 304 at the data center system 102 during the access process. In some embodiments, only new customer records are copied. For example, a synchronization process may occur. In other embodiments, all customer records may be copied to the global customer information database 212 by the customer information module 302. In alternative embodiments, customer records are not copied, but merely accessed by the customer information module 302 for processing.

Once accessed or stored, the exemplary format module 304 formats customer data from the customer records for use by the communication system 108. In exemplary embodiments, the format module 304 extracts the customer data from the customer records. Examples of customer data that may be extracted include name (e.g., Bob Jones), company (e.g., XYZ Company), potential or past deal amounts (e.g., $10,000), and subject matter of relationship (e.g., potential sale of computer systems). Further extracted customer data may include an account owner (e.g., one or more individuals of the user site 106 associated with an opportunity or subject matter involving the customer). Other examples of extracted customer data may include type of account (e.g., sales, support, etc.), open issues on the account, last contact date, date of anticipated close, probability of close, lead source, etc. Virtually any data stored in the customer information system 110 that is attached to an account may be extracted for use.

The extracted data may then be formatted by the format module 306 for use in the communication system 108. In exemplary embodiments, each extracted piece of data may be associated with a particular identifier associated with the customer (e.g., a phone number for Bob Jones). In some embodiments, the extracted data is indexed according to the customer identifier and stored in the formatted customer information database 214. In other embodiments, the extracted, formatted customer data may only be temporarily cached or not stored at all at the data center system 102.

In exemplary embodiments, the formatted customer data may then be delivered to the communication system 108 by the delivery module 306. The formatted customer data may be delivered to the communication system 108 periodically (e.g., every two minutes) or continuously in real-time by the delivery module 306. In one embodiment, a synchronization process may occur, thus insuring that the formatted customer information database matches a corresponding database at the communication system 108. In other embodiments, only new formatted customer records may be delivered to the communication system 108.

Alternatively, the formatted customer data may not be stored to the communication system 108. In some embodiments, the formatted customer data may be stored at the data center system 102 and/or the customer information system 110. In either of these cases, the formatted customer data may be accessed when an incoming communication is detected. In other embodiments, customer data extraction and formatting may be performed on-the-fly when an incoming communication is detected.

Figure 4:
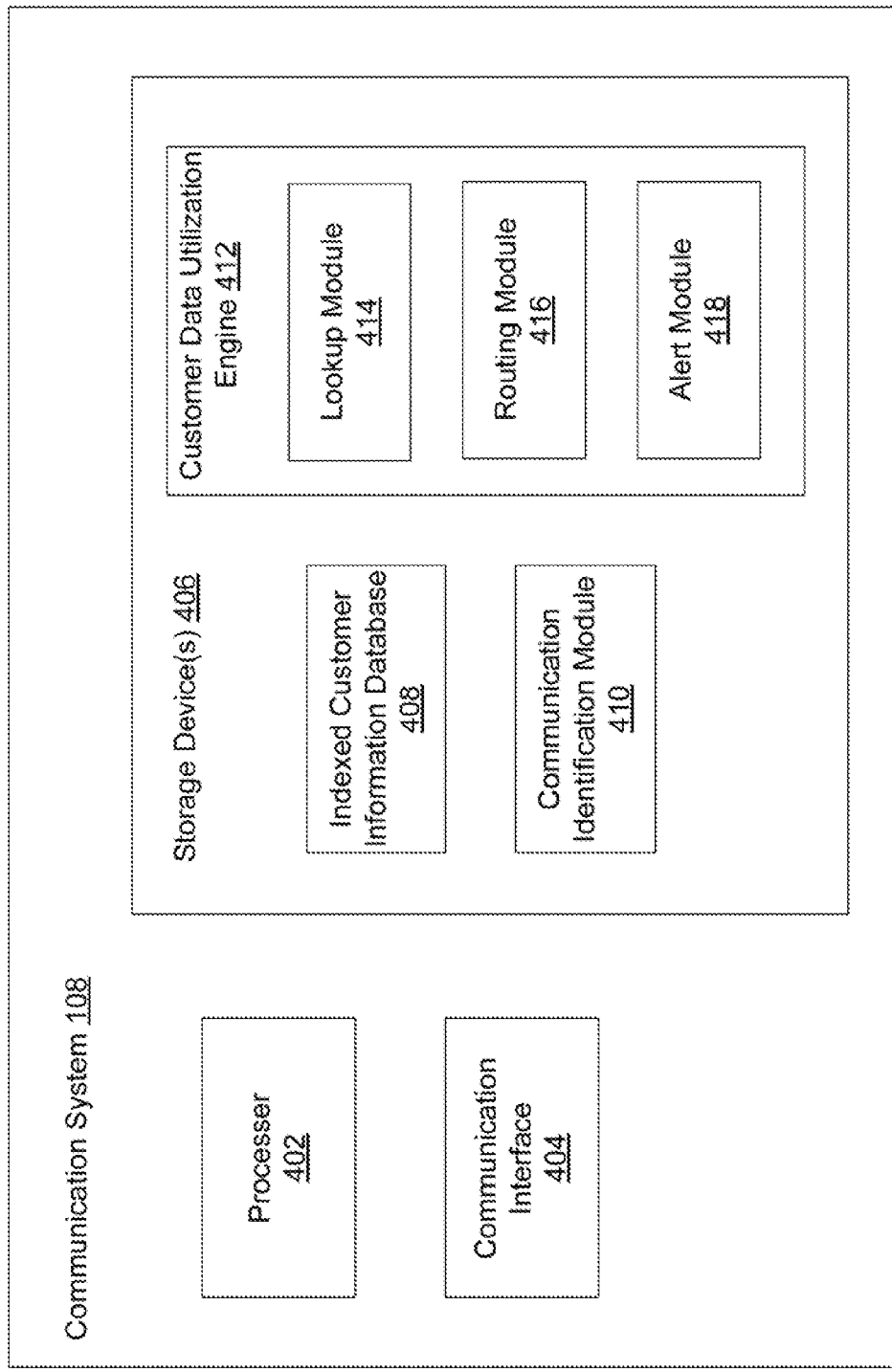
FIG. 4 is a block diagram of an exemplary communication system utilizing extracted customer data.

FIG. 4 is a detailed diagram of the communication system 108. In exemplary embodiments, the communication system 108 may comprise a processor 402, a communication interface 404, and one or more storage device(s) 406. The communication interface 404 is configured to enable the communication system 108 to communicate via the communication network 104. In various embodiments, the communication interface 404 may comprise ports, other hardware, and/or software that allow for communications to and from the communication system 108.

The storage device(s) 406 may comprise storage for a plurality of applications, components, databases, and modules. In the present embodiment, the storage device(s) 406 comprises an indexed customer information database 408, a communication identification module 410 and a customer data utilization engine 412. In various embodiments, the storage device(s) 406 may comprise memory devices, tape, disks, or integrated circuits. Alternatively, some of the components of the storage device 406 may be located at the data center system 102 and/or the customer information system 110.

The exemplary indexed customer information database 408 comprises the formatted customer data received from the data center system 102. The customer data may be indexed and stored based on one or more associated customer identifiers. The customer identifier may be a phone number or e-mail address, for example.

There are many advantages to storing the extracted, formatted customer data at the communication system 108. First, the customer data may be quickly accessed and provided to an agent. That is, the customer data may be accessed almost instantaneously with the receipt of the incoming communication. There is no need for embodiments of the present system to go out into a network or access the customer information system 110 every time customer data is required. Another advantage of having customer data on the communication system 108 is that the customer data is always available to the communication system 108. As such, even if there is a network failure or the customer information system 110 is down, the customer data is available. However, it is noted that a direct link may be provided in alternative embodiments between the communication system 108 and the customer information system 110.

The communication identification module 410 is configured to identify a communication identifier associated with an incoming communication. When a phone call is received by the user site 106, the communication identifier is determined. In some embodiments, the communication identification module 410 determines the communication identifier. In other embodiments, the communication identifier may be determined by another component of the communication system 108 or PBX system, and the communication identification module 410 is not needed or simply receives the communication identifier.

The customer data utilization engine 412 comprises a plurality of modules that utilize the formatted customer data in order to provide enhanced services associated with an incoming communication. In exemplary embodiments, the customer data utilization engine 412 comprises at least a lookup module 414, a routing module 416, and an alert module 418. Alternative embodiments may comprise further modules configured to utilize the customer data to enhance call features available to the communication system 108.

In exemplary embodiments, the lookup module 414 is configured to use the communication identifier to access customer data in the indexed customer information database 408. Because the indexed customer information database 408 is indexed by customer identifiers, the lookup module 414 determines if the communication identifier has a matching customer identifier in the indexed customer information database 408. If there is a match, the lookup module 414 or other components of the communication system 108 may quick access and/or retrieve the customer data. The accessed customer data may then be used by other modules of the customer data utilization engine 412.

During the lookup process, heuristics may be used by the format module 304 to determine which opportunity or subject matter is actually connected to a particular identifier. For instance, a customer identifier of "310-555-1212" may be associated with "Acme Plumbing." However, Acme Plumbing has five opportunities open within the customer information system 110, each of these opportunities owned by a different salesperson or agent. Heuristics may determine that a most recently created (but still open and not won or lost) opportunity is associated with an incoming communication. Alternatively, an opportunity that has been most recently updated in the customer information system 110 may be associated with the incoming communication.

The exemplary routing module 416 is configured to route incoming communications based in part on the communication identifier. Various routing schemes may be provided by the routing module 416. Based on the results of the lookup module 414, the routing module 416 may route the incoming communication to one or more correct call recipients (hereinafter identified as "agents" of the user site 106).

In one embodiment, account ownership routing may be performed by the routing module 416. In some situations, a customer may dial a general phone number for the user site 106. Instead of the call being placed in a general call queue, the incoming communication may be routed to an account owner as identified from the customer data. The account owner may be one or more agents that have a pre-existing relationship with the customer.

In another embodiment, the routing module 416 may perform group routing. In one instance, if the organization has two different sales teams, the routing module 416 can identify to which of the two sales teams to direct an incoming call. For example, the user site 106 may comprise a computer hardware sales team and a computer support sales team. The routing module 416 may determine, based on the results from the lookup module 414 in the indexed customer information database 408 that the customer is in discussion for the purchase support services for his recently purchased computer system. As a result, the incoming communication will be forwarded to the computer support sales team.

Similarly, the routing module 416 may perform a level routing scheme. In this embodiment, the importance of the caller can be determined based on the caller identifier. If the customer is considered important based on their customer data (e.g., a $1M customer, friend of the CEO, etc.), the customer should be sent to a higher level of support. In some embodiments, the customers may be ranked in priority or have some other indication of their importance indicated in their customer records. Thus, when an important customer calls, the incoming communication may be routed to a higher level of support agents by the routing module 416.

The exemplary alert module 418 is configured to provide a display comprising customer data to an agent prior to the agent answering the incoming communication. By providing pertinent customer data prior to establishing the communication, the agent may determine whether to answer the incoming communication. In some embodiments, the customer data may be displayed on a LCD or display portion on a communication device (e.g., a phone device). In other embodiments, some customer data may be display on a coupled computer display or monitor. In yet other embodiments, the customer data may be provided in a pop-up window in order to quickly provide the customer data to the agent.

Continuing with the above example, an alert may be displayed stating "Bob Jones; XYZ Company; $10,000; computer systems." In this example, the $10,000 represents a deal size. Thus, the agent will know the size of a sales opportunity before establishing the communication. If the agent is on another call (e.g., a $50 sales opportunity with new customer Smith), the agent may determine if he/she should end the current call to take the incoming communication which may potentially be more important (e.g., big, repeat customer Bob Jones) or be a bigger opportunity (e.g., $50,000 sales opportunity). Alternative embodiments may display less, more, or other information (e.g., date of last communication, personal information of note, etc.). It should be noted that the amount of information displayed may be limited to the size and capacity of the LCD or display portion on a communication device.

Figure 5:
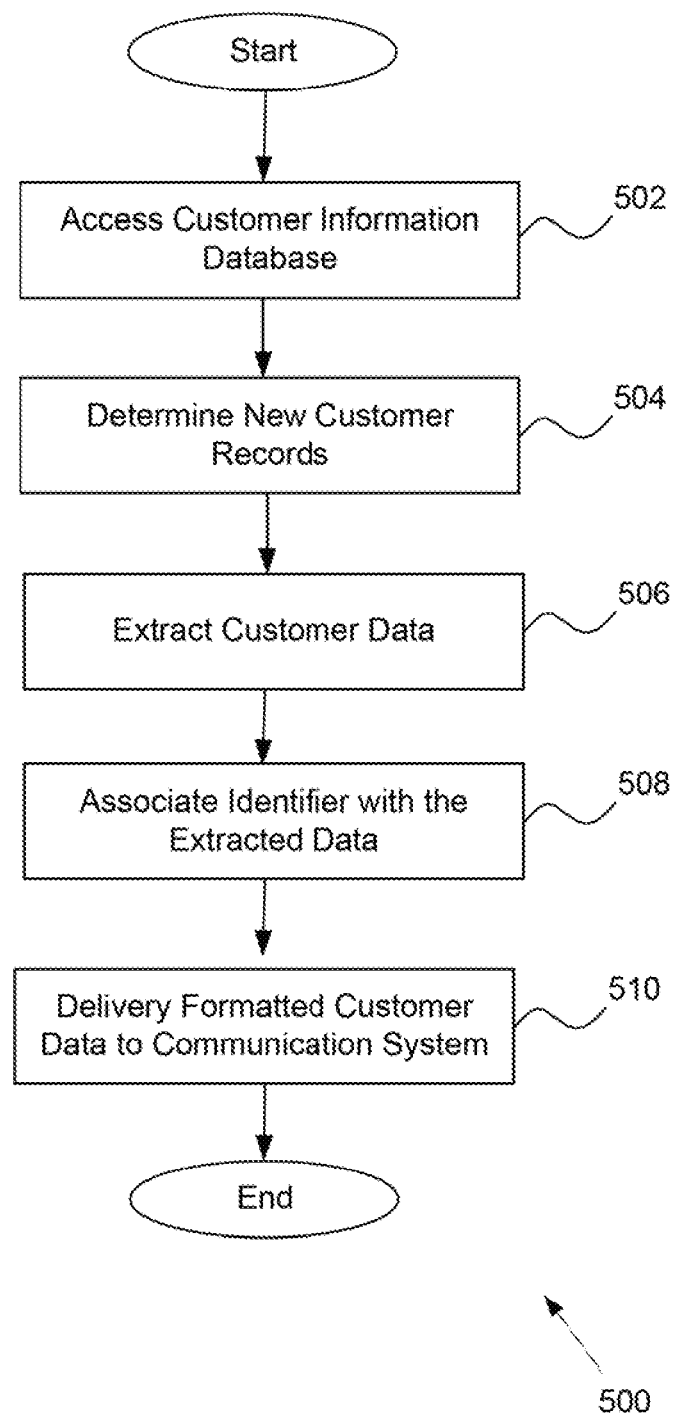
FIG. 5 is a flowchart of an exemplary method for formatting customer data for use in the communication system.

Referring now to FIG. 5, a flowchart 500 of an exemplary method for providing formatted customer records to the communication system 108 is shown. In step 502, customer records associated with the customer information system 110 are accessed. The customer information module 302 may access the local customer information database 112 for the customer records. In some embodiments, customer records may be copied to the global customer information database 212 by the customer information module 302. The access may occur periodically (e.g., every two minutes), in real-time, or be event driven (e.g., on-the-fly when a communication is incoming).

In step 504, new customer records are identified. In one embodiment, the customer information module 302 may determine which customer records have not been previously processed. For example, customer records with generation timestamps after the last access or copy process may be determined to be new.

Processing of the new customer records may then be performed in step 506. In exemplary embodiments, customer data may be extracted from the customer records and associated with a customer identifier by the format module 304. The extracted customer data may include, for example, customer name, customer's company, subject matter of previous interactions, money amount, account owner, etc.

The extracted data is then associated with a customer identifier in step 508. In some embodiments, the format module 304 may group the extracted customer data for a particular customer identifier within a single file. In other embodiments, the customer identifier may be linked with each extracted piece of data.

The customer data is then delivered to the communication system 108 in optional step 510. In exemplary embodiments, the delivery module 306 sends the customer data to the indexed customer information database 408. In some embodiments, the customer data is synchronized in real-time. Other embodiments may send all the formatted customer data to the indexed customer information database 408 essentially performing a synchronization process between the formatted customer information database 214 and the indexed customer information database 408.

Figure 6:
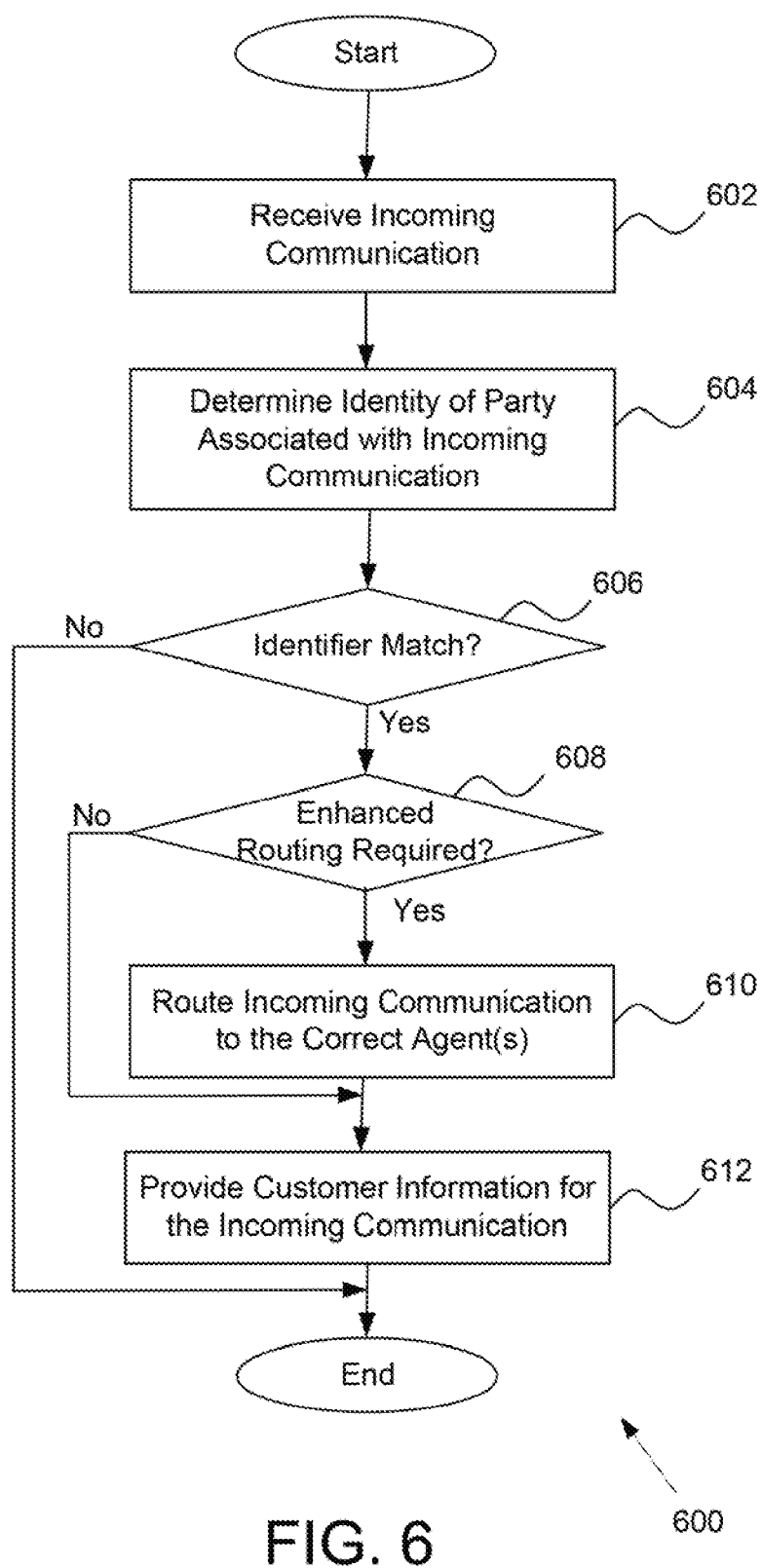
FIG. 6 is a flowchart of an exemplary method for utilizing the extracted customer data in the communication system.

FIG. 6 is a flowchart 600 of an exemplary method for utilizing the indexed customer data in the communication system 108. In step 602, an incoming communication is received by the communication system 108. The identity of the party (e.g., customer) associated with the incoming communication is determined in step 604. In exemplary embodiments, the communication identification module 410 is configured to identify a communication identifier associated with the incoming communication. In other embodiments, the communication identifier may be determined by another component of the communication system 108 or PBX system.

In step 606, the indexed customer information database 408 is accessed and a matching process performed. In various embodiments, the lookup module 414 will use the communication identifier from step 604 and access the indexed customer information database 408. The matching process is then performed where a determination is made as to whether the communication identifier matches a customer identifier. If a match is found, the associated customer data may be retrieved and used to provide enhanced services to the communication system 108.

In step 608, a determination is made as to whether the incoming communication needs to be routed. For example, if the customer dials a direct number for the agent in charge of his account, there is no need to route the call. However, if the customer calls a general number, then enhanced call routing may be needed. In these cases, the routing module 416 will use the retrieve customer data to determine one or more agents to which to route the incoming communication in step 610. The incoming communication may be routed to an account owning agent, a higher level agent, or one or more agents of a particular team, for example.

In some embodiments, heuristics may be used to determine the routing scheme. For example, the routing module 416 may first determine if an account owner is identified in the customer data and direct the incoming communication the account owner. If there is no account owner identified, then the routing module 416 may next determine if a priority level is associated with the customer data such that the incoming communication should be routed to a higher level of service. If there is no priority level, then the routing module 416 may then determine if a particular team of agents is associated with the customer identifier. It should be noted that any series of routing schemes may be developed for the communication system 108.

Customer information may be provided to the agent the incoming communication is directed to in step 612. In exemplary embodiments, the alert module 418 is configured to provide a display comprising customer data (e.g., customer name, customer's company, subject matter, potential dollar amount) to an agent prior to the agent answering the incoming communication. In some embodiments, the customer data may be displayed on a LCD or display portion on a communication device (e.g., a phone device). In other embodiments, some customer data may be display on a coupled computer display or monitor. In yet other embodiments, the customer data may be provided in a pop-up window in order to quickly provide the customer data to the agent.

It should be noted that the methods of FIG. 5 through FIG. 6 are exemplary methods. Alternative embodiments may contemplate different steps, combination of steps, or different order to the steps and still be within the scope of exemplary embodiments of the present invention. Additionally, some steps of FIG. 5 and FIG. 6 may be optional in alternative embodiments.

Figure 7:
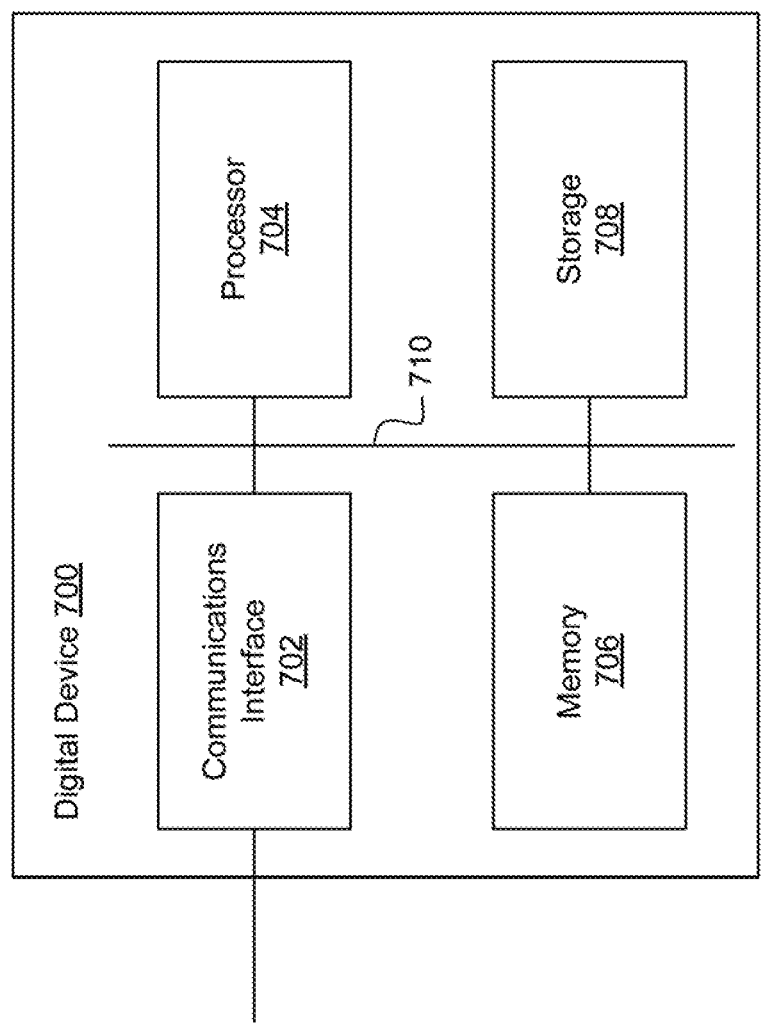
FIG. 7 is a block diagram of a digital device which may be used in accordance with exemplary embodiments.

FIG. 7 is a block diagram of an exemplary digital device 700 that may be used. The digital device 700 may comprise devices associated with the data center system 102 and user site 106 according to exemplary embodiments. The computing device, or digital device 700 comprises a communications interface 702, a processor 704, a memory 706, and storage 708, which are all coupled to a bus 710. The bus 710 provides communications between the communications interface 702, processor 704, memory 706, and storage 708. The processor 704 executes instructions, while the memory 706 permanently or temporarily stores data. Some examples of the memory 706 are RAM and ROM. The storage 708 may also permanently or temporarily stores data. Some examples of the storage 708 are hard disks and disk drives.

The embodiments of digital device 700 discussed herein are illustrative. As these embodiments are described with reference to illustrations, various modifications or adaptations of the methods and/or specific structures described may become apparent to those skilled in the art.

The above-described functions and components can be comprised of instructions that are stored on a storage medium. The instructions can be retrieved and executed by a processor (e.g., processor 704). Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. For example, while exemplary embodiments have been discussed with reference to configuration files in a communication system, the present invention may be practiced in any type of computing system which requires synchronization of files. Therefore, these and other variations upon the exemplary embodiments are intended to be covered by the present invention.

What is claimed:

1. A computer implemented method, comprising:
receiving an incoming communication from a customer associated with a first identifier on a phone line linked to a general phone number;
accessing customer data associated with the first identifier from a customer information warehousing system;
transferring at least a portion of the customer data from the customer information warehouse system to a local memory; and
routing the incoming communication to an account owner associated with the first identifier without placing the customer into a general call queue, based on the portion of the customer data stored in the local memory, the account owner comprising one or more agents that have a pre-existing relationship with the customer.

2. The method of claim 1, wherein the communication system comprises an indexed database that stores extracted customer data obtained from the call.

3. The method of claim 2, wherein the extracted customer data is associated with a customer identifier, the customer identifier comprising a phone number.

4. The method of claim 1, further comprising determining a call level for routing the call.

5. The method of claim 1, further comprising determining a particular group for routing the call.

6. The method of claim 1, further comprising determining a most recently updated subject matter associated with a customer identifier of the customer and a communication identifier.

7. The method of claim 1, further comprising using the extracted customer data to generate a display comprising the extracted customer data for the account owner prior to establishing a connection with the call between the account owner and the customer.

8. The method of claim 1 wherein the communication system comprises a phone system.

9. The method of claim 1, wherein the step of accessing customer records of the customer information warehousing system occurs upon receiving the call.

10. A system, comprising:
a phone line linked to a general phone number;
a database, the database storing a customer record associated with a first identifier;
a microprocessor coupled to the database;
a memory coupled to the microprocessor, wherein the memory contains an executable code to be processed by the microprocessor, wherein the executable code causes the microprocessor to:
extract customer data from the customer record;
transfer the customer data from the database to the memory; and
route an incoming communication to an account owner associated with the first identifier, without placing the customer into a general call queue, based on the customer data stored in the memory the account, owner comprising one or more agents that have a pre-existing relationship with the customer.

11. The system of claim 10, wherein the communication system comprises an indexed database that stores extracted customer data obtained from the call.

12. The system of claim 11, wherein the extracted customer data is associated with a customer identifier, the customer identifier comprising a phone number.

13. The system of claim 12, further comprising a lookup module configured to access particular extracted customer data on the indexed database based on a match between a communication identifier of an incoming communication and the customer identifier.

14. The system of claim 13, further comprising an alerts module configured to use the particular extracted customer data to generate a display comprising the particular extracted customer data prior to establishing a connection with the incoming communication.

15. The system of claim 14, wherein the communication system comprises a phone system.

16. A method for providing customer data in a communication system, the method comprising:
receiving a call from a customer associated with a first identifier on a phone line linked to a general phone number;
transferring stored customer data associated with the first identifier from a database to a local memory; and
routing the incoming communication to an account owner associated with the first identifier, without placing the customer into a general call queue using extracted customer data determined from the call and the stored customer data, the account owner comprising one or more agents that have a pre-existing relationship with the customer.

17. The method of claim 16, further comprising associating the customer identifier with the extracted customer data.

18. The method of claim 16, further comprising storing the extracted customer data to an indexed database of a storage device for use by the communication system, the extracted customer data indexed according to the customer identifier.

19. The method of claim 18, further comprising:
accessing the extracted customer data on the indexed database based on a match between a communication identifier of the call and the customer identifier;
identifying an opportunity or subject matter for the customer associated with the extracted customer data,
wherein the routing is further based on the opportunity or subject matter for the customer.

* * * * *